United States Patent [19]

Chow et al.

[11] Patent Number: 4,481,640
[45] Date of Patent: Nov. 6, 1984

[54] SPREAD SPECTRUM MODEM

[75] Inventors: Sherman M. Chow, Ottawa; Pok F. Lee, Richmond, both of Canada

[73] Assignee: Canadian Patents and Development Limited, Ottawa, Canada

[21] Appl. No.: 422,466

[22] Filed: Sep. 23, 1982

[30] Foreign Application Priority Data

Jun. 30, 1982 [CA] Canada .................................. 406395

[51] Int. Cl.³ .............................................. H04K 1/04
[52] U.S. Cl. .......................................... 375/1; 375/56;
375/84; 332/16 R
[58] Field of Search ....................... 375/1, 115, 83. 52,
375/56, 67, 84; 370/107, 12; 343/5 PN;
455/110, 205; 332/16 R

[56] References Cited

U.S. PATENT DOCUMENTS

| 3,891,959 | 6/1975 | Tsuji et al. | 375/56 |
|---|---|---|---|
| 3,924,186 | 12/1975 | Gordy et al. | 375/56 |
| 3,931,472 | 1/1976 | Gill et al. | 375/56 |
| 4,035,767 | 7/1977 | Chen et al. | 375/56 |
| 4,041,391 | 8/1977 | Deerkoski | 375/1 |
| 4,149,121 | 4/1979 | Gordy et al. | 375/1 |
| 4,211,996 | 7/1980 | Nakamura | 375/56 |
| 4,351,064 | 9/1982 | Ewanus | 375/1 |
| 4,359,779 | 11/1982 | Levine | 375/1 |

Primary Examiner—Robert L. Griffin
Assistant Examiner—Stephen Chin
Attorney, Agent, or Firm—Pascal & Associates

[57] ABSTRACT

A MODEM for a high frequency radio data link which substantially enhances the recovery of data transmitted via the link in the face of multipath distortion and fading. A serial digital input signal for transmission is split into odd bit and even bit data streams, having synchronous bit timing. Each pair of bits, referred to as a symbol, is phase shifted by $\pi/4$ which encodes its timing, for later clock recovery. The resulting signal is then twice differentially phase encoded which facilitates the recovery, when demodulated, of the original symbols overcoming the effect of Doppler shift and/or transmitted oscillator center frequency offset. The resulting signal then phase modulates a subcarrier signal having a frequency much higher than the symbol rate, and the phase modulated subcarrier is converted to a spread spectrum signal for transmission. This digital signal is provided to a high frequency analog transmitter for transmission with the signal spread over a particular HF channel, to a receive point. The spread spectrum signal thus substantially reduces or eliminates the effect of multipath fading, the double differential coding of the symbols substantially reduces or eliminates the effect of frequency shift due to slow changing Doppler shifts or other causes, and the phase shifting of each symbol, formed of two binary bits, in effect encodes the clock timing into the signal.

21 Claims, 10 Drawing Figures

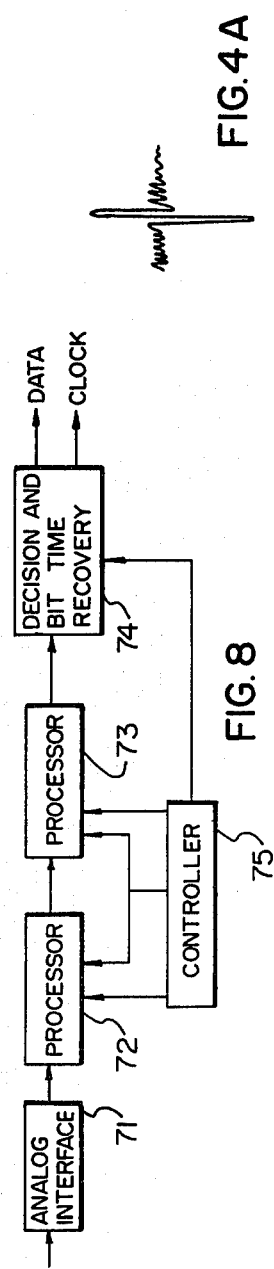
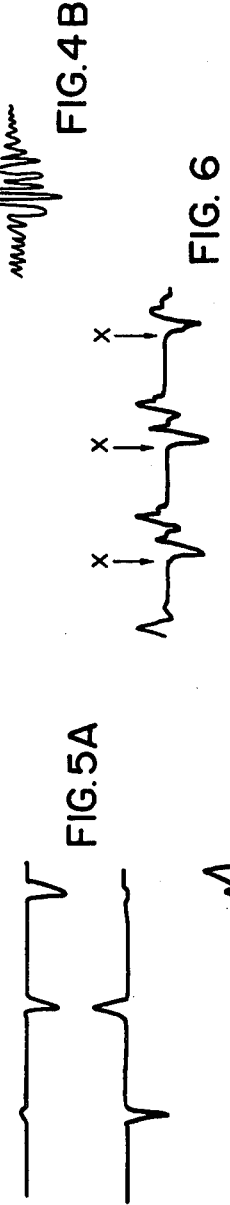
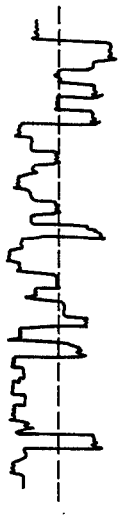
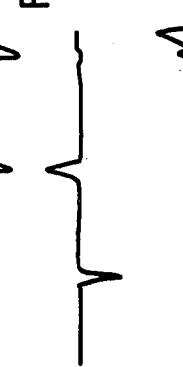
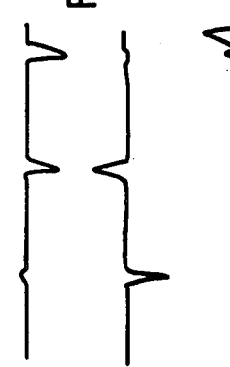

SPREAD SPECTRUM MODEM

BACKGROUND OF THE INVENTION

This invention relates to apparatus useful in communication systems, and is particularly directed to a MODEM (modulator-demodulator) useful for the transmission and/or reception of data signals via a high frequency communication link.

Since high frequency radio waves propagate beyond the line of sight by means of ionospheric reflections, long range communication between various locations several hundreds or several thousands of miles apart is possible, without using earth satellite repeaters. Such links are commonly used to and between remote locations, such as off-shore drilling platforms, marine traffic, and airplanes on transcontinental flights. In the past, such systems transmitted voice signals which are of course analog in form, but the need now exists for the transmission of digital signals.

However high frequency radio waves are subject to various forms of deterioration when travelling between a transmission and a receiving point. For example, the signals usally travel over several paths to the same point. Consequently due to different path lengths, a single signal element appears to "smear" in time, or the same signal can arrive time spaced from preceding similar elements, giving the appearance of echo. Due to ionospheric variations, the time shifts often vary, causing a constantly changing signal form. Variation in the ionosphere can also give rise to Doppler shifts in the frequency or phase of the high frequency signal. Further, the signal passing via various signal paths may fade; the phenomenon of fading is both path selective and frequency selective, and is both time varying and narrow-band and wide-band frequency selective, and affects virtually any frequency bands below the maximum usable frequency.

While the above-described problems associated with high frequency communication is significant with respect to analog signals, their effect on a reliable modern data communication link is more profound. Clearly echo and multipath fading can significantly effect the reliability of the data.

DESCRIPTION OF THE PRIOR ART

One way of attempting to counteract time dispersive affects of multipath is by keying data at a relatively low rate (e.g. 75 hertz) leaving the problem of frequency selective fading either unattended, or partly attended through the use of dual in-band diversity techniques. The use of code diversity at the expense of the data transmission rate has in the past provided reasonably reliable data links. However the cost of MODEMs applied to this purpose is very high.

U.S. Pat. No. 2,982,853 issued May 2nd, 1961, invented by R. Price and P. E. Green, describes the use of a wide-band signal, and a system for resolving individual multipath signals. In this system the signal arriving over each path is detected individually, and all detected signals are added after weighting by a factor maximizing the signal-to-noise ratio of the sum. The signal detected from each path are individually delayed by a proper amount, causing them to arrive at an addition point at the same time. Thus ambiguity between contiguous signal elements is removed. The time-aligned individual signals are added to form maximum strength signals.

In the aforenoted patent, different binary sequences are used to denote mark and space. Thus the received signal can be correlated with a local matching code. However, it has been found that errors can be introduced, and due to the sequence lengths required, data signal transmission remains relatively slow.

Further, the above system requires the instantaneous values and complex impulse response of the ionospheric channel to be accurately estimated periodically. Circuitry of considerable complexity is required to accomplish this.

SUMMARY OF THE INVENTION

In the present invention, estimation of channel characteristics is not required, thus simplifying its implementation. In the present invention, information is encoded as phase changes between adjacent symbols. The transmission rate is considerably faster (300 bits per second in the preferred embodiment), and means is provided for continuously recovering clock timing. The signal is converted to spread spectrum, which reduces the effect of selective path fading.

Further, the structure of the present invention is directly applicable to manufacture using VLSI technology, which considerably reduces its cost.

According to the present invention, a serial digital input signal is split into odd bit and even bit data streams, having synchronous bit timing. Each pair of bits, referred to as a symbol, is phase shifted by $\pi/4$ which encodes its timing, for later clock recovery. The resulting signal is then twice differentially phase encoded which facilitates the recovery, when demodulated, of the original symbols overcoming the effect of Doppler shift and/or transmitted oscillator center frequency offset. The resulting signal then phase modulates a subcarrier signal having a frequency much higher than the symbol rate, and the phase modulated subcarrier is converted to a spread spectrum signal for transmission. This digital signal is provided to a high frequency analog transmitter for transmission with the signal spread over a 3 KHz HF channel, to a receive point.

The spread spectrum signal thus substantially reduces or eliminates the effect of multipath fading, the double differential coding of the symbols substantially reduces or eliminates the effect of frequency shift due to Doppler or other causes, and the phase shifting of each symbol, formed of two binary bits, in effect encodes the clock timing into the signal. A highly reliable data transmission link results.

In order to receive the above-described form of signal, a demodulator according to the invention includes a circuit for receiving the signal after conversion to digital form, a pair of matched filters for coherent detection of he digital spread spectrum signal, one filter being matched to the in-phase component of the spread spectrum signal and one being matched to its quadrature component. The in-phase and quadrature autocorrelation functions of the spread spectrum digital code modulating the subcarrier signal is thus provided. The autocorrelation functions are then differentially decoded to provide in-phase and quadrature digital words comprised of the square of the autocorrelation functions, but devoid of the subcarrier signal (implicit demodulation). The in-phase and quadrature digital words are then passed through low pass filters having rectangular impulse response over the symbol interval, and simultaneously through differentiators, to provide four signals corresponding to the filter in-phase and quadrature digital words and differentiated in-phase and quadrature digital words. The four signals are then differentially decoded to provide a digital variable signal representative to the polarity of each bit of an odd bit data stream, a decision variable signal representative of the polarity of each bit of an even bit data stream, and a clock transition signal. The circuitry detects each negative transition of the clock transition signal, and forms a first clock signal; each of the decision variable signals is sampled at times related to each detected negative transition of the clock transition signal. The samples of the decision variables are then multiplexed to form an output data stream, and the rate of the first clock signal is multipled by two to provide an output clock signal. The complete form of the original input signal is thus recovered.

The use of the words "data" and values" herein denotes signal pulses, groups of which have predetermined meaning.

INTRODUCTION TO THE DRAWINGS

A better understanding of the invention will be obtained by reference to the detailed description below in conjunction with the following drawings, in which:

FIGS. 4A, 4B, 5A, 5B, 6 and 7 are waveform diagrams used to illustrate the invention, and FIG. 8 is a block diagram of a processor controlled embodiment of the demodulator of the MODEM.

DESCRIPTION

Figure 1:
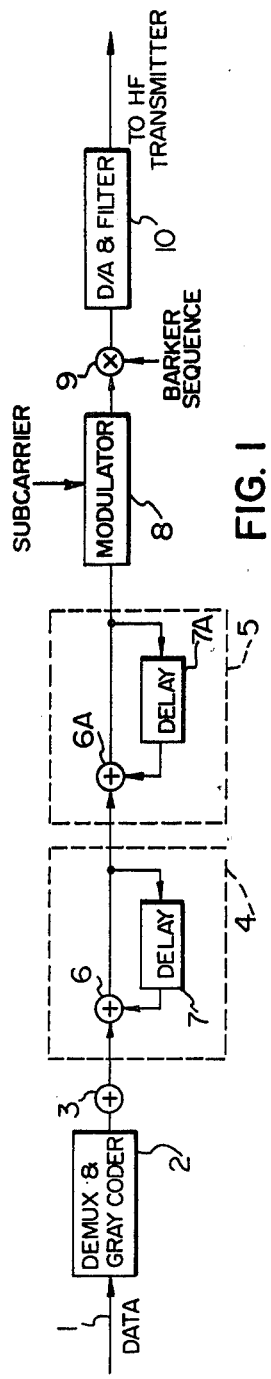
FIG. 1 is a block diagram of a modulator of the MODEM.

Concerning first the modulator, a block schematic of which is shown in FIG. 1, serial data is received via input path 1, and is applied to a demultiplexer and Gray coder 2. Here the serial data bits are separated into two data streams, one stream containing all of the even bits and one stream containing all of the odd bits of the received data. In the preferred embodiment, where the input data rate is 300 bits per second, the resulting bit rate in each of the two data streams would be 150 bits per second. The two data streams are adjusted in time, e.g. by introducing a delay in one stream, in order to time align the bits in each of the streams, i.e. make them synchronous. Each pair of synchronous bits, one from each of the data streams is considered as a two parallel bit symbol. Each of the two bit symbols thus can have a value of between 0 and 3, as shown in columns VALUE and A in Table 1 below.

TABLE 1

| VALUE | PHASE | A | B | C | D |
|---|---|---|---|---|---|
| 0 | 0 | 00 | 00 | 000 | 001 |
| 1 | π/2 | 01 | 01 | 010 | 011 |
| 2 | π | 10 | 11 | 110 | 111 |
| 3 | 3#/2 | 11 | 10 | 100 | 101 |

Column A in Table 1 shows a sequence of two bit symbols prior to Gray coding; column B shows the same symbol values after Gray coding. As is well known, Gray coding separates the values of groups of codes, so that in case of noise, only one bit error will occur instead of two.

The symbols are now applied to an adder 3, in which they are added by one-half and the result is multiplied by 2. Adder 3 may be substituted by a ×2 multiplier. The function of adder 3, whichever type of unit is used, is to shift the code one unit to the left, thus providing the codes shown in column C of Table 1. In addition, a phase shift of π/4 is given the symbols, resulting in the octal signal values shown in column D, of Table 1.

The effect of adding the codes by one-half is to encode the clock timing, for recovery at the receiver demodulator.

The octal signal is applied to a first differential encoder 4, from which it is applied to a second differential encoder 5. The first differential encoder 4 is functionally provided with a modulo 8 adder 6, which adds the input octal value signal with a delayed version of its output signal, having passed through a delay apparatus 7. The output signal of first differential encoder 4 is applied to the input of second differential encoder 5, which is constructed similar to differential encoder 4, and including a modulo 8 adder 6A and delay apparatus 7A.

The resulting octal form of digital output signal of differential encoder 5 is passed into a phase modulator 8, in than the input data stream. For example, for an input data stream of 300 bits per second, and a symbol rate of 150 symbols per second, the subcarrier frequency can be about 1500 hertz.

The output signal of modulator 8 has a 1500 hertz low passed Barker sequence or other spread spectrum generating code applied to it, e.g. by mixing it in multiplier 9. The purpose of mixing it with a Barker or other code periodic over the symbol interval is of course to generate a spread spectrum form of signal.

The output signal of multiplier 9 is an 8 bit digital signal representative of a double differentially phase coded π/4 phase shifted sequence of symbols phase modulated on a subcarrier signal having a frequency much higher than the bit rate of the binary symbols. This output signal is applied to a digital to analog converter and low pass filter 10 where it is converted into analog form and is smoothed. The analog signal output of filter 10 can now be applied to a high frequency radio transmitter, e.g. of single sideband type for transmission.

While modulator 8 and multiplier 9 have been shown as separate elements, it is preferred that both modulation and mixing with the Barker code should be done by means of a memory such as a PROM. For this implementation, the PROM stores 8 spread spectrum signal symbols which are addressed by the octal number output from the second diffferential encoder 5. By selecting a subcarrier frquency of 1500 hertz which results in an integral number (10) of subcarrier cycles per symbol, the PROM storage requirement is minimized. For the data and subcarrier rates referred to above, it is preferred that a sample rate of 8.1 kilohertz should be used, giving 54 samples per symbol. This sample rate is chosen to meet Nyquist rate requirements, assuming a 4.05 kilohertz signal requirement to be passed into a 3 kilohertz bandwidth standard high frequency channel.

It is preferred that the Barker or other appropriate code used should actually be one which is filtered so as to be band-limited. Since the normal Barker code provides side bands theoretically reaching to infinity, it is preferred that a Hamming weighted filtered Barker sequence should be used, limiting the bandwidth to about 1500 hertz. This will prevent aliasing as well as limiting the time of each value to avoid intersymbol interference.

Due to amplitude modulation by the Barker sequence, the phase modulated subcarrier has a spectrum consisting of replica of the baseband spectrum spaced at 150 hertz apart. The modulator output is an 8 PSK signal, which is equivalent to 4 PSK signal, in terms of phase noise margin since the least significant bit in each octal digit is designed to be high at all times (i.e. see column D, Table 1).

It should be noted that if only a single differential encoder had been used, Doppler and/or transmitter oscillator center frequency offset would result in a translation of the original baseband spectrum after signal recovery at the receiver equipment. This would cause a constant phase offset in the receiver decision signal vector at the demodulator. For this reason the second differential encoder 5 is used, which removes the constant phase offset in the signal vector.

Figure 2:
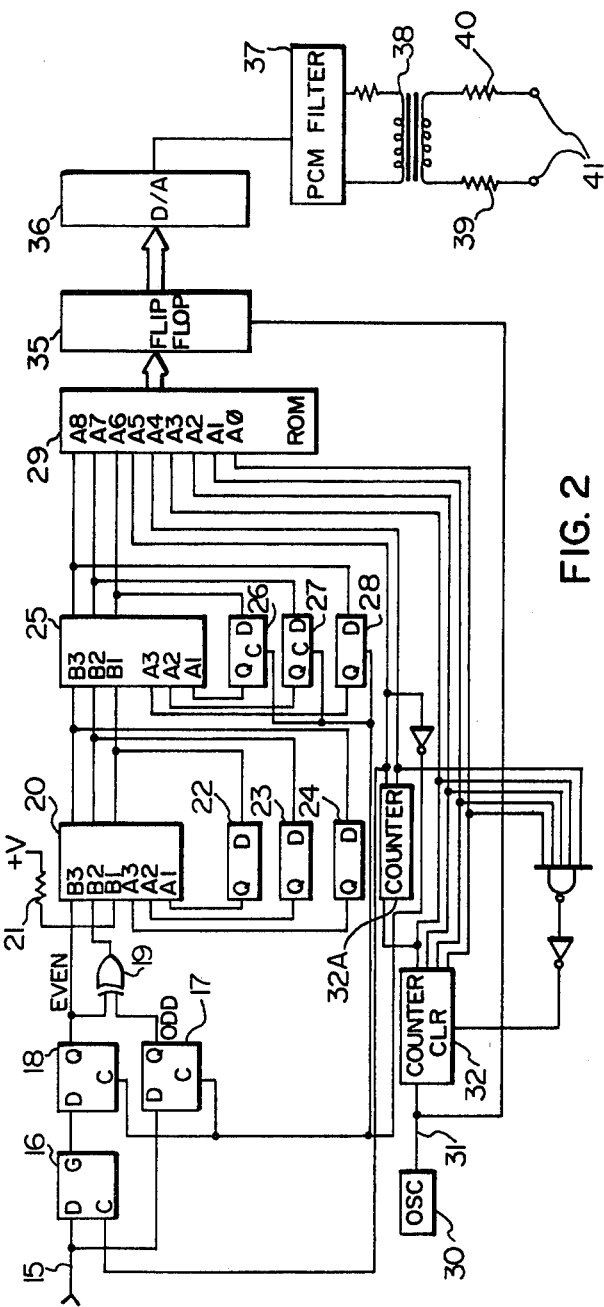
FIG. 2 is a schematic diagram of the modulator of the MODEM.

A preferred form of the modulator is shown in FIG. 2. A 300 bit per second serial digital signal preferably of NRZ binary form is assumed to be received at an RS232 protocol port, and is converted by circuitry outside this invention to TTL level, which is carried on lead 15. The signal is applied to the D input of flip-flops 16 and 17. Both of flip-flops 16 and 17 are clocked at 150 hertz, with opposite phase. Consequently each second bit passes through flip-flop 16 to flip-flop 18, which is clocked in synchronism with flip-flop 17. The result is separation of the odd and even bits and delay of one bit in flip-flop 16, thus synchronizing pairs of bits in the two data streams (one passing through flip-flop 18 and one passing through flip-flop 17). The Q outputs of flip-flops 17 and 18 are applied to corresponding inputs of EXCLUSIVE OR gate 19 and applied to three bit modulo 8 adder 20 with the Q output of flip-flop 18. A third input of three input adder 20 is connected to +5 V through resistor 21, which provides a 1 bit in the least significant position.

The function of adding a third bit to the two Gray coded bits in the least significant bit position input to 3 bit adder 20 is equivalent to adding the Gray coded input signal by one-half and multiplying the result by two. For example, each of the values of colum B in Table 1 is converted to the values in column D, which has a decimal value of twice the value of column B as a result of shifting the B column bits one column to the left and adding a 1 in the least significant bit column.

The signal at each output terminal of adder 20 is passed through a 1 bit delay element provided by flip-flops 22, 23 and 24 respectively, the outputs of which are connected to the second of the three inputs A1, A2 and A3 of adder 20. The resulting sum output signals of adder 20 are applied to the B1, B2 and B3 inputs of a second modulo 8, 3 bit adder 25. The signals at the outputs of adder 25 are passed through corresponding 1 bit delay elements provided by flip-flops 26, 27 and 28, the outputs of which are applied to the A1, A2 and A3 second inputs of adder 25.

The function of adder 20 with delay element flip-flops 22, 23 and 24 is to provide the function of differential encoder 24, in which the delay output signal of the adder is summed with the input signal to the adder. The second differential encoding is performed in a similar fashion by adder 25 with delay element flip-flops 26, 27 and 28.

The resulting octal output signal of adder 25 is applied to the most significant bit address inputs A6–A8 of a ROM 29. The amplitude values of a band limited Barker sequence or code are stored in the ROM, which is addressed by the octal code output signal of adder 25.

The least significant 6 bits of the Barker code address are input to ROM 29 via inputs A0–A5. The values of the signal applied thereto are generated by a crystal oscillator 30, shown simply as oscillator 30, but in actual realization providing a signal which is divided down in frequency from high frequency oscillator to a 8100 hertz rate on lead 31, and is applied to a 4 bit counter 32 which feeds counter 32A. Counter 32A is a 2 bit counter operating from the most significant bit output of counter 32. The combined outputs of counters 32 and 32A (÷54) are applied to address inputs A0–A5 of ROM 29.

The most significant bit of counter 32A is clock pulses at 150 hertz. These are applied to the clock input of flip-flop 16 while the inverted version is applied to flip-flops 17, 18, 22, 23, 24, 26, 27 and 28.

The output signal from ROM 29, an 8 bit signal, is applied to edge triggered octal flip-flop 35, in which the bit signal transitions are aligned. The 8 bit output of flip-flop 35 is applied to digital to analog converter 36 in which the signal is converted into analog form, and is then applied to PCM reconstruction filter 37 in which it is smoothed. The output signal of PCM filter 37 is applied through a transformer 38 in which it is converted into balanced or diffferential form: it is then impedance corrected by series resistors 39 and 40, from which it is applied to output terminals 41 for application to a high frequency radio transmitter for transmission.

Figure 3:
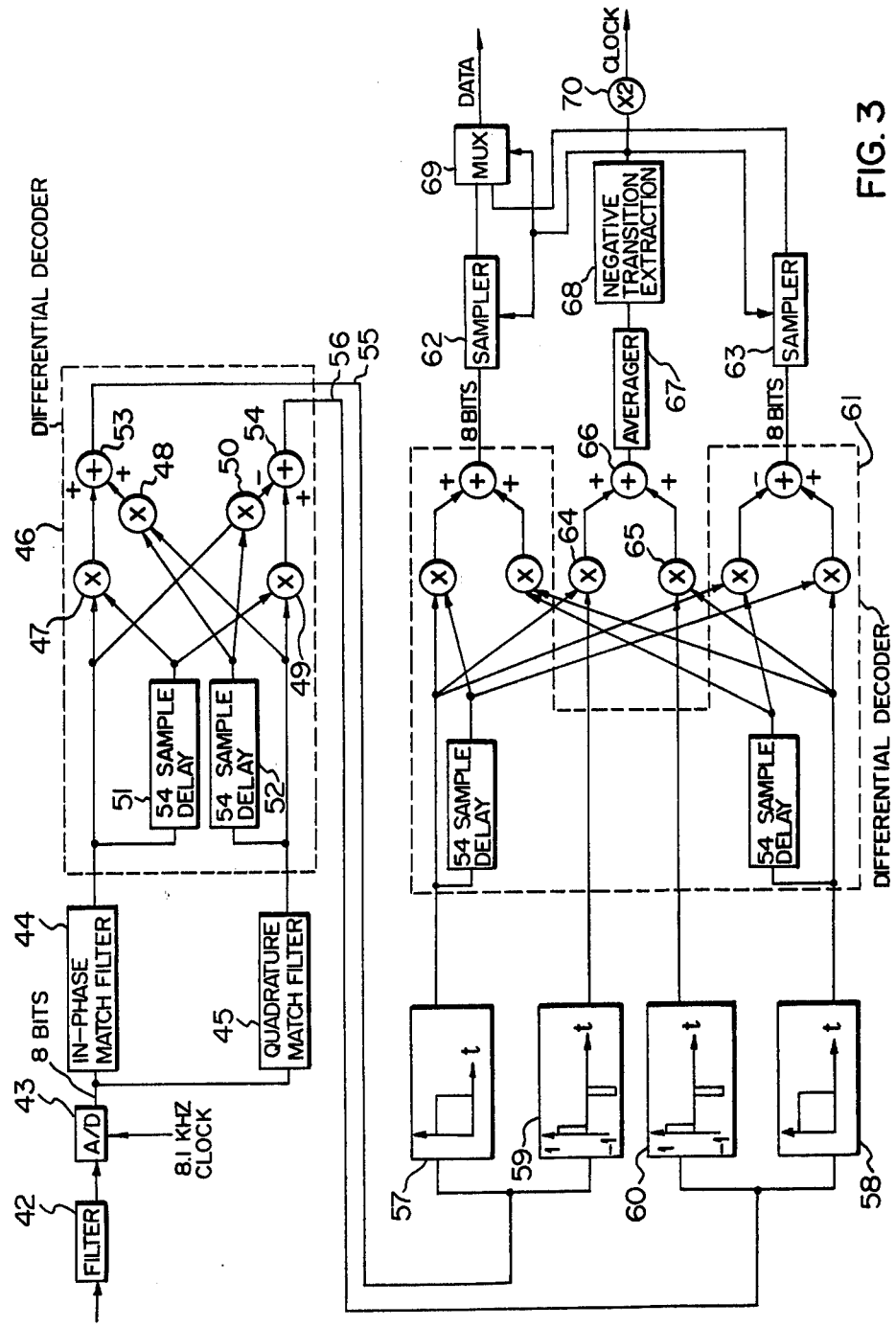
FIG. 3 is a block diagram of the demodulator of the MODEM.

FIG. 3 shows a block diagram of the demodulator of the MODEM. After reception by a high frequency analog receiver, the signal, distorted by multipath and detuning error is passed through a low pass filter 42 to remove aliasing energy which is above, preferably 3.5 kilohertz, and is then applied to the input of analog-to-digital converter 43, which is supplied with an 8.1 kilohertz clock signal. The analog-to-digital converter 43 digitizes the recovered spread spectrum signal into 8 bit samples, which are applied to a pair of matched filters 44 and 45. Matched filter 44 is matched to the in-phase component of input signal while matched filter 45 is matched to the quadrature component. The matched filters can be transversal filters, and should be matched to a passband version of the Barker sequence or other pseudo noise code embedded in the input signal, with the center frequency at 1500 hertz (to match the subcarrier frequency in the modulator). The output signal of each matched filter is comprised of the autocorrelation function of the Barker or other sequence modulating the subcarrier.

FIG. 4A is a wavefom diagram showing a single pulse at the output of either matched filter which is undistorted by multipath distorion. FIG. 4B shows a similar signal but having been distorted by multipath. A plurality of peaks is in evidence, as would be expected due to the signal arriving at different times having passed along different time path lengths. The output of each filter therefore is a series of pulses whose envelope is the approximate ionospheric impulse response, and whose phase contains the transmitted information. With the bit rate and sampling rate described, demodulation successfully takes place when the characteristics of the ionosphere as defined by the impulse response is substantially unchanged in over three consecutive symbol intervals and the multipath spread of the propagation modes are less then 6.6 milliseconds. Both of these conditions are usually satisfied in most cases for which this MODEM finds application.

The output signals of the matched filters are now applied to a first differential decoder 46, the output signals of which are in-phase and quadrature representations of the square of the autocorrelation function. The differential decoder can be implemented in a variety of ways. In the structure shown in block 46, the output of each matched filter is multiplied with a 54 sample delayed representation of itself in multipliers 47 and 48, and the outputs of each of the filters is multiplied with a 54 sample delayed version of output of the opposite matched filter in multipliers 49 and 50, the delay circuits being shown as references 51 and 52. The outputs of multipliers 47 and 48 are added in adder 53 while the output of multiplier 50 is subtracted from the output of multiplier 49 in subtractor 54. The resulting in-phase square of the autocorrelation function is obtained on signal path 55 and the equivalent quadrature signal is obtained on signal path 56.

The representative in-phase and quadrature auto correlation squared functions for a non-frequency-shifted and non-multipath-distorted signal are shown in the upper and lower waveform diagrams of FIG. 5A. The upper and lower waveform diagrams of FIG. 5B respectively show in-phase and quadrature auto-correlation functions of a multipath distorted signal.

The signals still contain a constant phase rotation caused by frequency offset, and the bit timing has not yet been recovered. This is performed as noted below. The autocorrelation squared signals are applied to low pass filters 57 and 58, which have impulse response corresponding to a rectangular pulse of duration equal to the symbol period, i.e. 6.6 msec. The autocorrelation squared functions are also applied to filters 59 and 60 whose impulse responses are the derivatives of those of filters 57 and 58.

The output signals of filters 57 and 58 are differentially decoded in differential decoder 61 in a manner identical to that described earlier with reference to differential decoder 46, to provide output signals to samplers 62 and 63 respectively. The signals represent the odd data stream and even data stream decision variable signals respectively.

The output signals of filters 57 and 59 are multiplied in multiplier 64 while the output signals of filters 58 and 60 are multiplied in multiplier 65. The resulting output signals are added in adder 66, and the sum signal is averaged in averager 67.

The output signal of averager 67 is shown in FIG. 6. The signal input to averager 67 is a phase error signal which is the derivative of the magnitude of the signal vector formed by the outputs of filters 57 and 58. The consistent negative transitions in this signal which occurs at a rate of 150 hertz signify the correct bit sampling instants. The averager 67 reduces the effect of random noise.

The noise reduced derivative signal is applied to a negative transition extraction circuit 68 which detects the occurrence of the negative transitions in the aforenoted derivative signal and will be discussed further below. The output signal is applied to samplers 62 and 63, whose outputs are representative of the decision variables. The sign bits of these 2's complement digital outputs are the original transmitted bit pairs. These bit pairs are applied to inputs of a multiplexer 69, with the timing signals output from the negative transition extraction circuit 68. Since the output signal of sampler 62 is representative of the value of the odd bit, at 150 hertz, and the output signal of the sampler 63 is representative of the value of the even bit at the same bit rate, multiplexer 69 interleaves them, providing an output signal which is the reconstituted data signal originally transmitted at 300 bits per second.

The output signal frequency of negative transition extraction circuit 68 is multiplied by two in multiplier 70 to provide a 300 bit per second clock.

The negative transition extraction circuit detects negative transitions of the input signal thereto (which may be seen in FIG. 6) and which occur once each 54 samples. The circuit thus counts 54 and senses for another negative transition. After several detections, it is likely that the correct bit recovery transition has been detected and this can be used as the correct timing. If the input signal fades, after missing the negative transition, the 54 sample time consideration should be stopped, and an original negative transition searched for. It should be noted that due to multipath fading, the position of the negative transition can shift and a window period for detection should be allowed for.

An 8.1 kilohertz clock is preferred to be used since 54 samples of each symbol at a rate of 150 symbols per second results in the 8.1 kilohertz rate.

It is preferred that the demodulator should be implemented digitally. A block diagram for realizing a digital implementation is shown in FIG. 8. The received analog signal is input into an analog interface 71 which contains an anti-aliasing low pass filter and an 8 bit analog-to-digital converter as described earlier.

The resulting output signal is applied to a digital processor 72. Processor 72 performs the complex matched filtering and differential decoding operations according to the algorithm described earlier. The matched filter co-efficients can be stored in a ROM (read only memory). Preferably the circuit processes the signal in a time division multiplexed manner. After matched filtering and differential decoding in processor 72, the time multiplexed signals are applied to processor 73 which provides box car filtering followed by differential decoding, as described with reference to FIG. 3. The resulting output signal is applied to a decision and bit time recovery circuit 74 which performs the function of samplers 62 and 63, averager 67, negative transition extractor 68, multiplexer 69 and multiplier 70. The output signals of circuits 74 are the data and clock signals. A digital signal processor controller 75 can be used to generate all the system clocks as well as the control words or microcodes required for the processors 72 and 73 and circuit 74.

It is expected that the demodulator described can be implemented in many different forms in addition to those noted above using the structure and functions described. The digital form preferably should have a time multiplexed realization, although this is not essential.

A person skilled in the art understanding this invention may now conceive of other embodiments or variations and design, using the principles described herewith. All are considered to be within the sphere and scope of this invention as defined in the claims appended hereto.

We claim:

1. A MODEM apparatus comprising:

(a) means for phase shifting input binary pair symbols by $\pi/N$, for an N-PSK system, where N is a positive integer, (b) means for twice differentially phase encoding the phase shifted symbols, (c) means for phase modulating a subcarrier signal having a frequency much higher than the input binary pair symbols, by the differentially phase encoded symbols, and (d) means for converting the phase modulated subcarrier signal to a spread spectrum output signal for transmission.

2. A MODEM apparatus comprising:

(a) means for adding input binary pair symbols corresponding to data to be transmitted by one-half to obtain octal binary symbols, (b) means for differentially phase encoding the octal binary symbols twice sequentially, (c) means for phase modulating a carrier signal having a frequency much higher than the octal binary symbol by the octal binary symbols, and (d) means for mixing the phase modulated carrier signal with a predetermined coded sequence to obtain a spread spectrum output signal.

3. A MODEM apparatus as defined in claim 1 further including a D/A connected for receiving the output signal and providing an analog form of output signal for application to a transmitter.

4. A MODEM apparatus as defined in claim 2 or 3 including means for receiving a digital signal, means for separating odd and even bits of the digital signal into separate bit streams, and means for time shifting one of the bit streams to align the timing of pairs of bits in both bit streams to provide said input binary pair symbols.

5. A MODEM apparatus as defined in claim 2 or 3 including means for receiving a digital signal, means for separating odd and even bits of the digital signal into separate bit streams, means for time shifting one of the bit streams, and means for Gray coding the pairs of bits to provide said input binary pair symbols.

6. A MODEM apparatus comprising:

(a) means for receiving a digital signal having a first bit rate, (b) means for separating the odd and even bits of the digital signal into separate bit streams having a second bit rate half the first bit rate, (c) means for time shifting one of the bit streams to time align pairs of bits of the bit streams, each pair defining a symbol, (d) means for phase shifting the symbols by $\pi/N$, for an N-PSK system, where N is a positive integer, (e) means for twice differentially phase encoding the phase shifted symbols to provide symbols defined by binary octal digits at the second bit rate, and (f) means for phase modulating a predetermined coded sequence amplitude modulated subcarrier having a frequency much higher than the second bit rate, to provide a spread spectrum digital output signal.

7. A MODEM apparatus as defined in claim 6 further including means for converting the digital output signal to an analog form of spread spectrum signal for presentation to a high frequency transmitter.

8. A MODEM apparatus as defined in claim 6 in which the converting means is a digital-to-analog converter followed by a smoothing filter.

9. A MODEM apparatus as defined in claim 6, 7 or 8 further including a Gray code encoder for receiving an input signal, encoding it, and providing said digital signal having a first bit rate.

10. A MODEM apparatus as defined in claim 6, 7 or 8 including a memory having Barker code values stored therein, means for addressing the memory at locations defined by said octal digits, and means for advancing the addresses in said memory during each octal code address interval to obtain adjacent Barker code values at a rate defined by the Nyquist sampling frequency.

11. A MODEM apparatus as defined in claim 5, 6 or 8, and a Gray code encoder for receiving an input signal, encoding it, and providing said digital signal having a first bit rate, and further including a memory having Barker code values stored therein, means for addressing the memory at locations defined by said octal digits, and means for advancing the addresses in said memory during each octal code address interval to obtain adjacent Barker code values at a rate defined by the Nyquist sampling frequency.

12. A MODEM apparatus comprising:

(a) means for separating the odd and even bits of a digital input signal into odd and even bit stream having corresponding time aligned pairs of bits, having a predetermined bit rate, (b) means for Gray coding said pairs of bits, (c) means for phase rotating the Gray coded bit pairs by $\pi/N$, for an N-PSK system, where N is a positive integer, (d) first differential encoding means for differentially encoding the phase rotated bit pairs comprised of means for adding an output signal of the differential encoding means with the phase rotated bit pairs in a modulo 8 adder, (e) second differential encoding means for further differentially encoding the bit pairs comprised of means for adding an output signal of the second differential encoding means with the output signal of the first differential encoding means in a second modulo 8 adder, to provide an octal digital signal, (f) a memory having a pseudo noise code identical to a type embedded in the input signal stored therein, (g) means for sequencing the addresses in the memory during each octal address interval at a frequency much higher than the predetermined bit rate, to provide a memory output signal comprised of digital values defining a spread spectrum signal, and (h) means for converting the digital spread spectrum signal to an analog form of spread spectrum signal.

13. A MODEM apparatus as defined in claim 12 in which the pseudo noise code is band limited to the edges of a single HF radio channel.

14. A MODEM apparatus as defined in claim 12 or 13 in which the digital input signal has a bit rate of about 300 baud, and the frequency of sequencing of the memory addresses is about 8100 hertz.

15. A MODEM apparatus as defined in claim 12 or 13 in which the digital input signal has a bit rate of about 300 baud, and the bandwidth of the analog form of spread spectrum signal is about 3 kilohertz.

16. A MODEM apparatus comprising:

(a) means for receiving a digital spread spectrum signal comprised of double differentially phase encoded $\pi/4$ phase shifted pairs of binary bits phase modulated on a subcarrier signal having a frequency much higher than the bit rate of the binary symbols, (b) a pair of matched filters for coherently detecting the digital spread spectrum signal, one matched to the in-phase component of the spread spectrum signal and one matched to its quadrature component, to provide in-phase and quadrature autocorrelation functions of the spread spectrum digital code amplitude modulating on the subcarrier signal, (c) means for differentially decoding the autocorrelation functions to provide in-phase and quadrature digital words comprised of the square of the autocorrelation functions devoid of the subcarrier signal, (d) means for passing the in-phase and quadrature digital words through low pass filters having impulse response corresponding to a rectanular pulse of width equal to the symbol period and also through differentiating filters, to provide four signals corresponding to the filtered in-phase and quadrature digital words and the derivatives of the filtered in-phase and quadrature digital words, (e) means for differential decoding said two filtered signals to provide a decision variable signal representative of the polarity of each bit of an odd bit data stream, a decision variable signal representative of the polarity of each bit of an even bit data stream, (f) means for operating on said four signals to provide a phase error signal, (g) means for detecting each negative transition of the phase error signal and forming a first clock signal, (h) means for sampling each of the decision varible signals at a time related to each said detected negative transition, (i) means for multiplexing the samples of the decision variable signals to form an output data stream, and (j) means for multiplying the rate of the first clock signal to provide an output clock signal.

17. A MODEM apparatus as defined in claim 16 also including means for receiving a baseband analog spread spectrum signal of predetermined form from a radio receiver, and for converting said signal to said digital spread spectrum signal.

18. A MODEM apparatus as defined in claim 16 or 17 including digital processing means comprised of a microprocessor and memory for multiplex processing the digital spread spectrum signal, and forming the matched filters, differential decoding means, low pass filters, detecting means, sampling means and multiplex means, coefficients of the matched filters being retained in said memory.

19. A MODEM apparatus as defined in claim 1, 2 or 6 in which the subcarrier frequency is an integral multiple of the symbol rate.

20. A MODEM apparatus as defined in claim 2 or 6, in which the predetermind coded sequence is a Barker sequence.

21. A MODEM apparatus as defined in claim 12 or 13, in which the pseudo noise code is a Barker code.

* * * * *